(12) United States Patent
Block

(10) Patent No.: US 6,701,353 B1
(45) Date of Patent: Mar. 2, 2004

(54) SYSTEM FOR RESPONDING TO NEW MESSAGE POLLING FROM CLIENTS

(75) Inventor: Frederick P. Block, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 09/311,525

(22) Filed: May 13, 1999

(51) Int. Cl.[7] .......................... G06F 15/16; G06F 17/40
(52) U.S. Cl. ..................... 709/219; 709/206; 709/100
(58) Field of Search .................................. 709/203, 228, 709/214, 229, 206, 900; 379/88

(56) References Cited

U.S. PATENT DOCUMENTS

| 6,014,502 A | * | 1/2000 | Moraes | 709/219 |
| 6,067,561 A | * | 5/2000 | Dillon | 709/206 |
| 6,138,141 A | * | 10/2000 | DeSimone et al. | 709/203 |
| 6,154,764 A | * | 11/2000 | Nitta et al. | 709/200 |
| 6,181,781 B1 | * | 1/2001 | Porter et al. | 379/88.17 |
| 6,192,407 B1 | * | 2/2001 | Smith et al. | 709/229 |

* cited by examiner

Primary Examiner—Dung C. Dinh
(74) Attorney, Agent, or Firm—Patton Boggs LLP

(57) ABSTRACT

A system for optimizing server response time to polling for new e-mail messages by a client. A cache of memory storing information about a user for responding to polling queries is maintained by the server. When a polling session is established, the client transmits a query to the server. The server receives the query and reads the cache to retrieve the user information that includes the response to the query. The response read from the cache is then transmitted to the client.

14 Claims, 4 Drawing Sheets

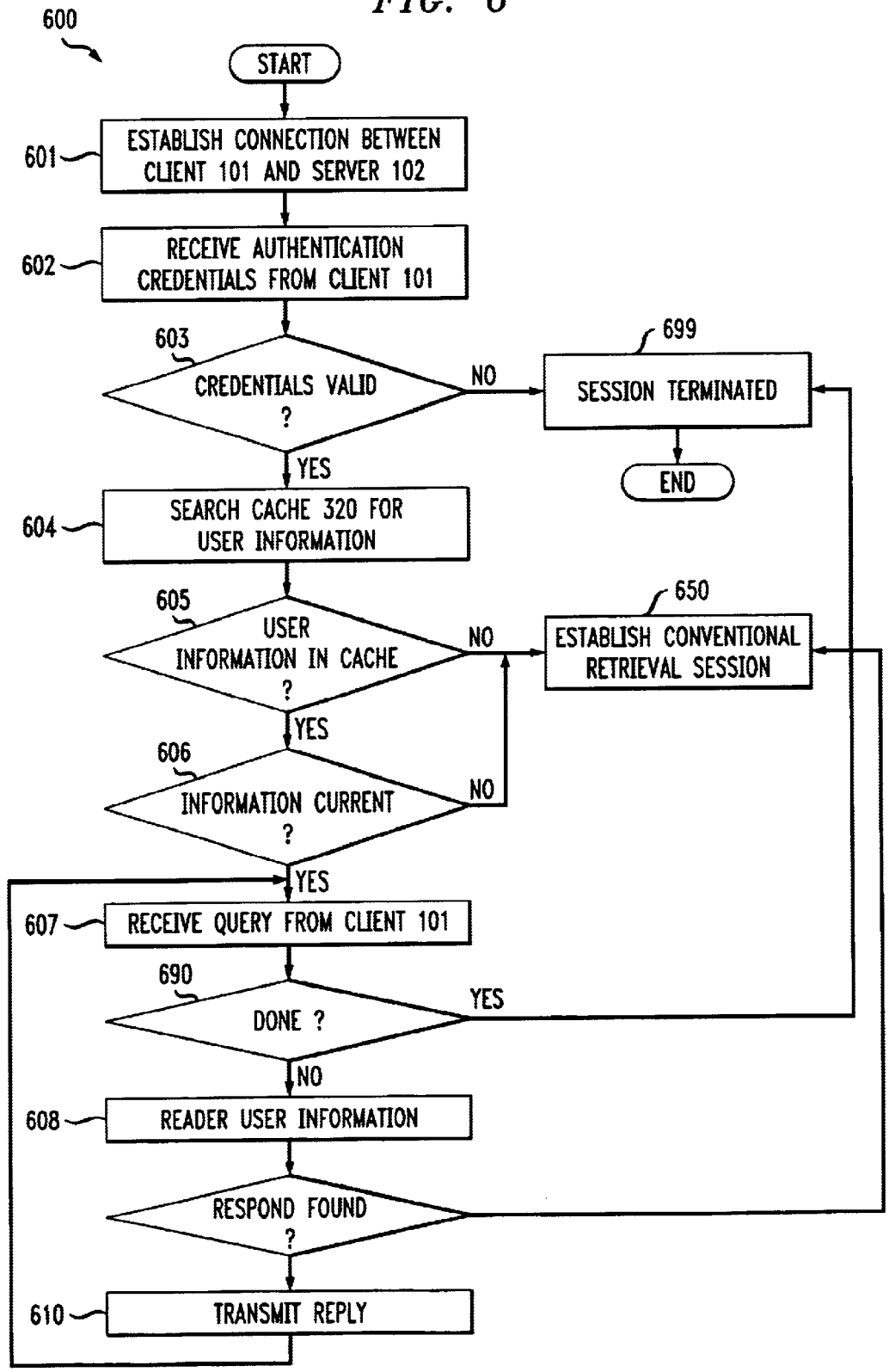

SYSTEM FOR RESPONDING TO NEW MESSAGE POLLING FROM CLIENTS

FIELD OF THE INVENTION

This invention relates to a server providing a client access to messages via standard internet e-mail protocols. Still more particularly, this invention relates to a system by which a server responds to polling by a client to determine whether a user has new messages in an e-mail system.

PROBLEM

Today, Electronic mail (e-mail) is a popular form of communication. E-mail is messages that are transmitted between users via computers connected by the Internet or some other network. E-mail messages are messages that may contain data files, display data, executable programs, or any other information that can be represented in digital form.

User access to e-mail is typically provided in the following manner. A server, which is a computer system that is connected to other servers via the Internet, receives messages for a user that have an e-mail address specifying the server and the user. The messages for each user are then stored by the server in a memory and given a unique identification.

When a user wants to retrieve e-mail received by the server for the user, the user establishes a connection to the server with a client which is a computer or other device, such as a wireless telephone or alphanumeric pager. For a client that is a computer, the connection is typically a telephone call over a telephone line via a modem in the client. However, sometimes the communication link may be over Local Area Network (LAN), or wireless LAN. The client and server then communicate using some known protocol, such as TCP/IP, to transfer data between the two computers. In order to provide e-mail to the user, an e-mail protocol is used in TCP/IP communications to transfer e-mail data between the client and server. The predominant e-mail retrieval protocols currently in use are POP3 and IMAP4. Client applications that support these protocols are available for most client computers and supporting these protocols is becoming increasingly important for all messaging systems including proprietary LAN based messaging systems, and voice messaging systems.

In order to retrieve messages for a user, the client establishes an e-mail session by providing authentication credentials, such as a user identification and a password, to the server in the e-mail protocol. If the authentication credentials are correct, a retrieval session with the server is established. In order to get new mail, the client interrogates the server to determine whether the server is storing any new messages for the user. The method of interrogation depends on the e-mail protocol used. For example, an interrogation in POP3 includes the client requesting a list of message identifications of messages being stored for the user. The identifications are then compared to a list of identifications on the client and if any new messages exist, the new messages are retrieved by the client.

It is a problem that many users repeatedly establish a connection with the server to determine whether new messages exist. Typically, the software application executed by the client to retrieve e-mail for a user is programmed to establish a connection with the server and poll for new e-mail messages every few minutes while the user is logged in or using the client computer. Therefore, a great amount of the computational time of the server is spent generating responses to the polling queries transmitted by the clients. This limits the number of clients that a server may serve over a given period of time. The problem is exacerbated in an arrangement in which the e-mail retrieval protocol is added to an existing messaging system either as an add-on software module or as an intermediary server. There is a need in the art for a system that reduces the computational load for a server that is responding to new message polling by clients.

SOLUTION

The above and other problems are solved and an advance in the art is made by the provision of a system by which a server identifies polling queries in a retrieval session by a client and handles the retrieval session differently than normal sessions. A first advantage of this invention is that the system reduces the computational load of a server responding to queries polling for new e-mail messages. The server can then service more clients in the same amount of time. A second advantage of this invention is that the client e-mail software does not have to be changed in order for the server to use this system to respond to polling queries during retrieval sessions.

The system for identifying and handling polling queries is software that is executed by either a server computer directly providing e-mail service to users or an intermediary server providing an e-mail protocol to some other messaging system. The software of this system maintains a cache of user information which is used to generate responses to queries sent by a client during retrieval sessions when the user does not have new mail. The cache of user information may only contain users that have recently polled for new mail, all users, or users that frequently poll the server.

The cache is then used in the following manner to respond to a retrieval session by a client trying to determine whether a user has received new mail. The server receives an interrogation query from the client. The cache maintained by the software is read for user information that responds to the query. The response read from the cache is then transmitted to the client.

One preferred exemplary embodiment of the above system operates in the following manner. When a client establishes a connection with the server, authentication credentials, such as a user name and a password, are transmitted to the server. If the authentication credentials are verified by the server, the server uses the user name to determine whether information for the user is stored in a memory cache maintained by the software. If information about the user is not in the cache, a conventional retrieval session is established.

If information about the user is stored in the cache, the server may determine whether the user information in the cache is current. One process for determining whether the information is current is comparing a time stamp of the last conventional retrieval session with a time of last change in a user mailbox. It is also possible to eliminate this step by removing user information when a new message is added to the mailbox of the user.

If the information is current, the e-mail retrieval session is assumed to be a retrieval session and is handled in the following manner. The client transmits a message to the server with a request for information. The server receives the message and reads the information in the cache to respond to the request. If the server reads the requested information from the cache, the information is transmitted to the client. If the information is not stored in the cache, a normal retrieval session is established in which the server must generate the response by reading the e-mail message database.

DESCRIPTION OF THE DRAWINGS

The above and other aspects of the present invention can be understood from the detailed description and the following drawings:

FIG. 6 illustrating a flow chart of a polling process performed by a server in a retrieval session.

DETAILED DESCRIPTION

Figure 1:
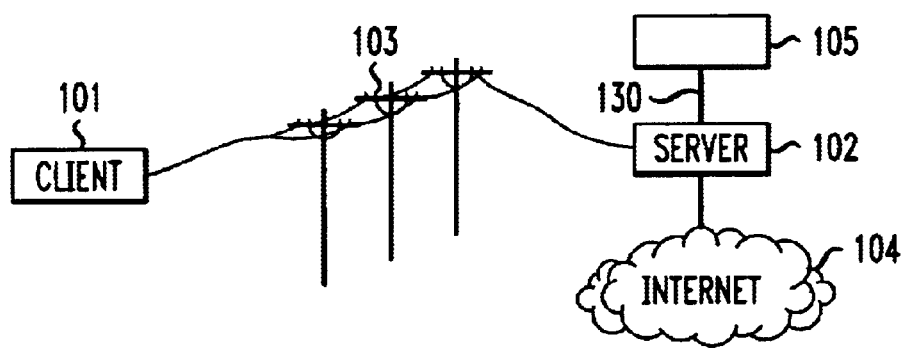
FIG. 1 illustrating a telephonic connection between a server and a client.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 2:
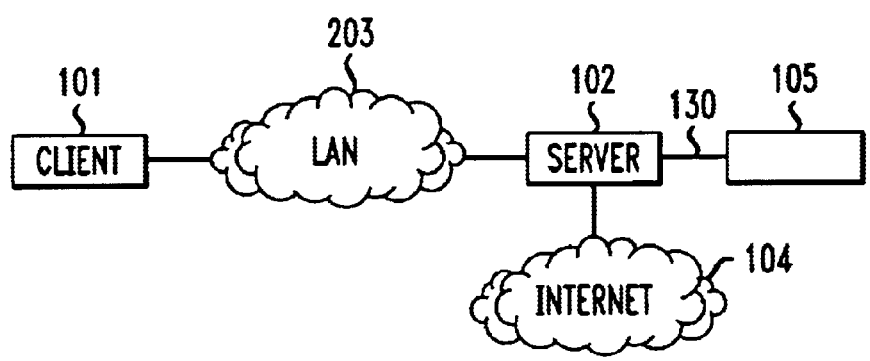
FIG. 2 illustrating a LAN connection between a client and a server.

FIGS. 1 and 2 illustrate two possible exemplary physical connections between a client computer 101 and a server computer 102 in which server computer 102 performs software applications that provide the polling response system of this invention. One skilled in the art will recognize that there are other possible systems for establishing communication between client 101 and server 102 which are omitted for brevity of this discussion. Server 102 is a computer system or other system, such as a voice messaging system, that communicates with other servers over the Internet 104 to send and receive messages. Client 101 is a computer system or other device, such as a wireless telephone or alphanumeric pager, that establishes a communicative connection with server 102 to retrieve e-mail messages from server 102. In FIG. 1, client 101 is connected to server 102 via telephone network 103. In order to connect to telephone network 103, client 101 requires a modem (not shown) and software applications that can use the modem to establish a connection with another computer such as server 102. In FIG. 2, client 101 is connected to server 102 via Local Area Network (LAN) 203. In order to connect to LAN 203, client 101 requires an Ethernet card and proper software applications. In both FIGS. 1 and 2, server 102 may support an e-mail retrieval protocol and store messages in a database or server 102 may support an e-mail retrieval protocol on behalf of messaging system 105 that is connected to server 102 via path 130.

Figure 3:
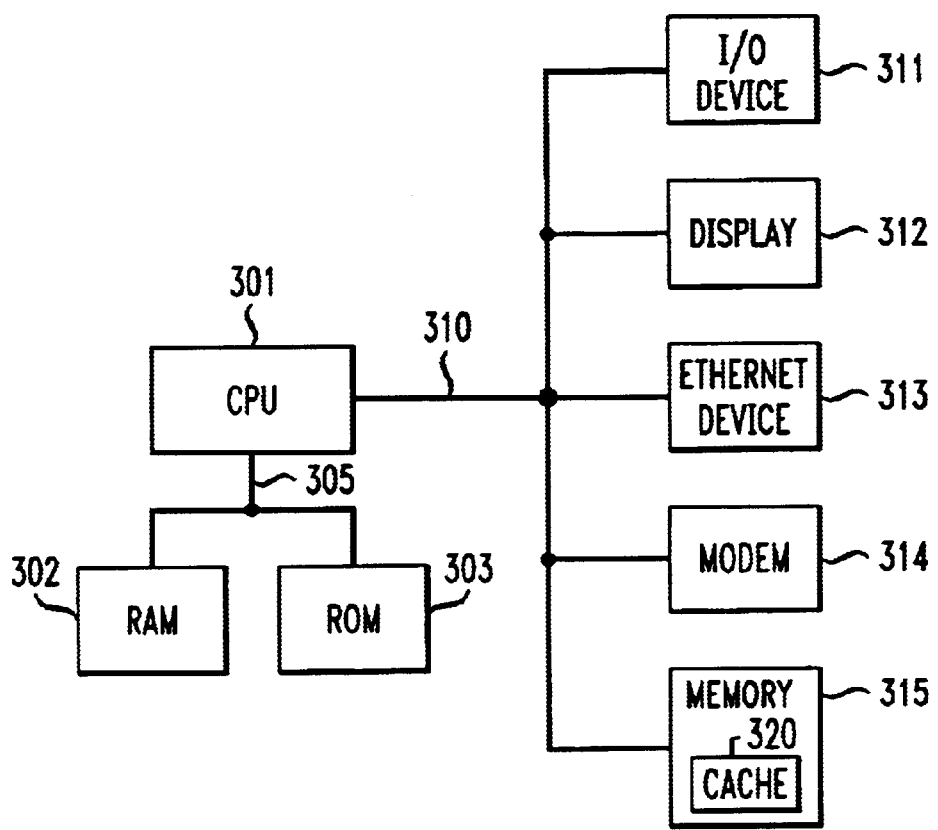
FIG. 3 illustrating a block diagram of components of a server computer.

FIG. 3 illustrates a block diagram of components in Server 102. Central Processing Unit (CPU) 301 is a processor or group of processors that executes instructions read from a processor readable media to perform the services provided by server 102. CPU 301 reads data from and writes data to Random Access Memory (RAM) 302 and Read Only Memory (ROM) 303 via memory bus 305. RAM 302 is a volatile memory that stores instructions and data for applications being currently executed by the CPU 301. ROM 303 is a non-volatile memory that stores instructions needed to provide an operating environment for applications executed by CPU 301.

I/O bus 310 connects CPU 101 to I/O devices 311–315. Data is transmitted over I/O bus 310 between CPU 301 and I/O devices 311–315. The following I/O devices 311–315 are exemplary and are not meant to limit the present invention. I/O device 311 is an input device such as a keyboard, mouse or microphone that allows a user to input data into the system. Display 312 is a display that may display visual data to a user. Ethernet device 313 allows server computer 102 to communicate in a LAN. Modem 314 provides telephonic connects to server 102. Finally, memory device 315 is a secondary device that can store great amounts of data. One example of memory device 315 is a disk drive that can write and read data to and from magnetic media in a disk.

The present invention is a use of a cache 320 stored in a memory such as memory device 315. Cache 320 is maintained by software executed by CPU 301 to store user information collected during a conventional retrieval session and then use the information to respond to queries of a polling nature in subsequent session established by clients when the client has no new messages. The present invention allows existing client software to be used while providing a more efficient manner of response by server 102. If a new message is received for the user or if a query is made by client 101 that is not related to polling for new messages, a conventional retrieval session is established. Therefore, the optimization provided is transparent to the software executed by client 101 to provide e-mail to a user.

Figure 4:
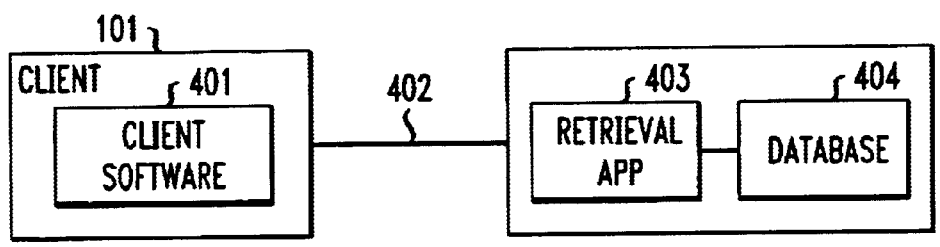
FIG. 4 illustrating a block diagram of software connections between a client system, and a server with polling software of the present invention being executed by the email server.

FIG. 4 illustrates the relationship of software operating to provide e-mail service using the polling response system of the present invention in a system where server 102 executes the polling software of this invention and stores e-mail messages. Client 101 executes client software 401 which uses the physical connection between client 101 and server 102 to transmit messages in an e-mail retrieval protocol 402, such as POP 3 or IMAP 4, embedded in a communication protocol such as TCP/IP. Server 102 executes a polling server application 403 that supports e-mail retrieval protocol 402 and user message database application 404. Polling server application 403 maintains cache 320 in a memory such as memory 315 described above to respond to polling by client 101. User message database application 404 maintains a database of messages in a memory such as memory device 315.

Figure 5:
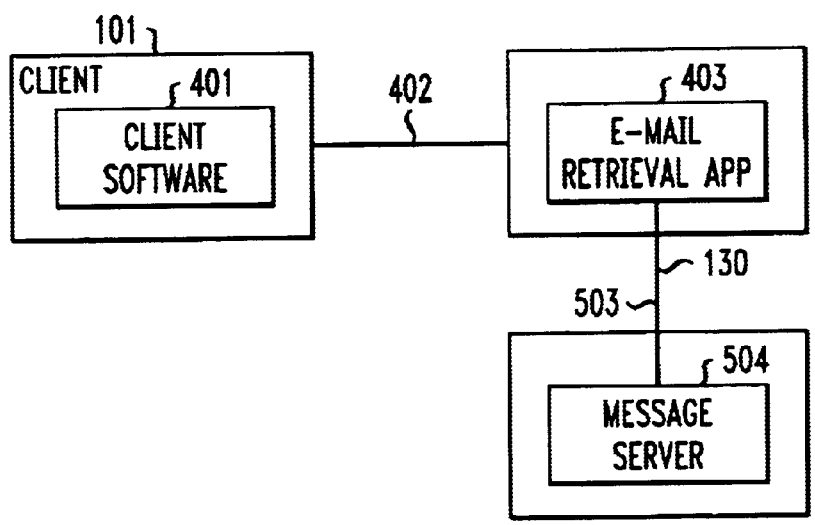
FIG. 5 illustrating an alternative block diagram of software connections between a client computer, an intermediary polling server executing the polling software of this invention and a messaging system maintained by a server.

FIG. 5 illustrates an alternative relationship between software operating on client 101, server 102, and messaging system 105. Client 101 executes client software 401 which communicates using e-mail retrieval protocol 402 which is a protocol such as POP 3 or IMAP 4 that is embedded in a communication protocol such as TCP/IP used for communication between client 101 and server 102. Server 102 executes polling software 403 which communicates with client software 401 using e-mail protocol 402 and with a message server application 504 using a retrieval protocol 503 which is embedded in a communications protocol such as TCP/IP used to communicate over path 130. Message system 105 has a processor that executes message server application 504 that maintains a message database in a memory device to store messages for users.

FIG. 6 illustrates process 600 by which polling software 403 (FIG. 4) responds to a query from a client 101 using the optimization of the present invention. Process 600 begins in step 601 in which a connection is established between client 101 and server 102. This connection is a telephonic, LAN, or other type of connection in which a protocol such as TCP/IP is used for communication between client 101 and server 102. A communication protocol such as e-mail retrieval protocol 402 is utilized for communication between client 101 and server 102. E-mail retrieval protocol 402 is typically an Internet standard e-mail protocol such as POP 3 or IMAP 4 which are well known in the art.

After a connection is established, client 101 transmits authentication credentials such as a user identification and password to server 102 in accordance with e-mail retrieval protocol 402. Server 102 receives the authentication credentials in step 602. In step 603, it is determined whether the authentication credentials received are valid either by server 102 or by an exchange of messages between server 102 and message system 105. If the authentication credentials are not valid, the session is terminated in step 699. If the authentication credentials are valid, cache 320 is searched for information about the authenticated user in step 604.

In step 605, it is determined whether user information was found in cache 320. If information for the authenticated user is not found in cache 320, a conventional retrieval session is established in step 650. When a conventional retrieval session is established in step 650, the user information retrieved to generate responses is store to cache 320 to be used in a later session.

If information for the authenticated user is found in cache 320, it is determined whether the cached information is current in step 606. This may be done in the following manner. Every time user information is stored to cache 320, a time stamp the storing is recorded with the user information. The time stamp is read in step 606, the server then either access the database or the message system and reads a time stamp that indicates when the mailbox was last updated. If the time stamp of the user information is the most recent time then the information is current. Those skilled in the art will recognize that other methods for determining whether information is current. One such alternative method is removing user information when a new message is received for the user. If the information is not current, a conventional retrieval session is established in step 650.

If current information for the user is found in the cache, process 600 proceeds in the following manner. First a query is, received from client 101 in step 607. For example, a POP3 UIDL request which requests a list of unique identifiers for messages stored in a user mailbox for the authenticated user. In step 690, it is determined whether the request is a terminate request such as a QUIT command in POP3. If the request is a terminate request, the session is terminated in step 699.

In step 608, the user information is read from cache 320. It is then determined whether the response was found in step 609. If the response is not found in step 609, a conventional retrieval session is established in step 650. If the response is found in step 609, the response is transmitted to client 101 in step 610 and process 600 is repeated from step 607.

A process is needed to maintain the user information in cache 320. The user information in the cache can be kept in any of the following manners. A user's information can be added to the cache for every conventional retrieval session established for a user with other users being removed in a First in First Out (FIFO), Last In First Out (LIFO), frequency of use or any other method that a designer of the system may choose.

The above is a system for responding to polling queries for new e-mail messages. It is expected that those skilled in the art can and will be able to generate alternative system that infringe on the invention as sent forth in the claims recited below either literally or through the Doctrine of Equivalents.

What is claimed is:

1. A message polling system for responding to a client that is polling a message server system to retrieve messages for a user, said message polling system comprising:

means for maintaining a cache memory that stores user information for each of a plurality of users, said user information comprising a last transmitted response, when that user does not have new mail, generated by said message server system in response to a message retrieval poll received from said client in a previous message retrieval session for a user;

means for receiving a second message retrieval poll from said client for said user;

means, responsive to a determination that said message server system fails to have an unretrieved message addressed to said user stored therein, for retrieving said user information, stored for said user, from said cache memory;

means for using said retrieved user information from said cache memory to generate a response to said second message retrieval poll; and means for transmitting said generated response to said client.

2. The message polling system of claim 1 wherein said means for maintaining comprises:

means, responsive to said second message retrieval poll being received by said message server system, for updating said user information stored in said cache memory to indicate that said second message retrieval poll has arrived at said message server system.

3. The message polling system of claim 1 further comprising:

means for establishing a communication connection with said client; and means for receiving authentication credentials from said client.

4. The message polling system of claim 3 further comprising:

means, responsive to a determination that said user information corresponding to said authentication credentials is stored in said cache memory, for determining whether said user information is current.

5. The message polling system of claim 3 further comprising:

means, responsive to a determination that said user information is not stored in said cache memory, for establishing a message retrieval session with said client.

6. The message polling system of claim 5 further comprising:

means, responsive to said message retrieval session being established, for updating said user information stored in said cache memory.

7. The message polling system of claim 1 wherein said messages stored in said message server system for said user are e-mail messages.

8. A method of operating a message polling system for responding to a client that is polling a message server system to retrieve messages for a user, said message polling system comprising the steps of:

maintaining a cache memory that stores user information for each of a plurality of users, said user information comprising a last transmitted response, when the user does not have new mail, generated by said message server system in response to a message retrieval poll received from said client in a previous message retrieval session for a user;

receiving a second message retrieval poll from said client for said user;

retrieving, in response to a determination that said message server system fails to have an unretrieved message addressed to said user stored therein, said user information, stored for said user, from said cache memory;

using said retrieved user information from said cache memory to generate a response to said second message retrieval poll; and transmitting said generated response to said client.

9. The method of claim 8 wherein said step of maintaining comprises:

updating, in response to said second message retrieval poll being received by said server, said user information stored in said cache memory to indicate that said second message retrieval poll has arrived at said message server system.

10. The method of claim 8 further comprising the steps of:

establishing a communication connection with said client;

receiving authentication credentials from said client.

11. The method of claim 10 further comprising the step of:

determining, in response to a determination that said user information is stored in said cache memory, whether said user information is current.

12. The method of claim 10 further comprising the step of:

establishing, in response to a determination that said user Information is not stored in said cache memory, a message retrieval session with said client.

13. The method of claim 12 further comprising the step of:

updating, in response to said message retrieval session being established, said user information stored in said cache memory.

14. The method of claim 8 wherein said messages stored in said message server system for said user are e-mail messages.

* * * * *